United States Patent [19]

Krude et al.

[11] Patent Number: 4,629,028
[45] Date of Patent: Dec. 16, 1986

[54] WHEEL ASSEMBLY WITH UNIVERSAL JOINT DRIVE

[75] Inventors: Werner Krude, Siegburg-Kaldauen; Alfons Jordan, Hennef, both of Fed. Rep. of Germany

[73] Assignee: Uni-Cardan Aktiengesellschaft, Siegburg, Fed, Rep. of Germany

[21] Appl. No.: 405,164

[22] Filed: Aug. 4, 1982

[30] Foreign Application Priority Data

Aug. 17, 1981 [DE] Fed. Rep. of Germany ....... 3132364

[51] Int. Cl.$^4$ ............................................. B60K 17/24
[52] U.S. Cl. ..................................... 180/259; 180/254
[58] Field of Search ............. 180/259, 254, 258, 70 R, 180/73 R

[56] References Cited

U.S. PATENT DOCUMENTS 3,586,357  6/1971  Orain ................................. 287/53 R
4,493,388  1/1985  Welschof et al. ................... 180/258

Primary Examiner—John J. Love
Assistant Examiner—Donn McGiehan
Attorney, Agent, or Firm—Toren, McGeady, Stanger, Goldberg & Kiel

[57] ABSTRACT

A wheel assembly for a motor vehicle including a bearing assembly rotatably mounting a wheel and a universal joint for driving the wheel. An inner bearing ring of the wheel assembly is fitted in rotative driving engagement with the outer joint member of the universal joint and an outer circumferential portion of the inner bearing ring is formed with a configuration generally corresponding with the configuration of an inner contour of the outer joint member to establish a form-fitted rotative driving connection between the universal joint and the bearing assembly. A securing ring is provided for maintaining the inner bearing ring and the outer joint member axially fixed relative to each other and the fitted connection is formed with interfitting recesses and projections.

4 Claims, 5 Drawing Figures

WHEEL ASSEMBLY WITH UNIVERSAL JOINT DRIVE

The present invention relates generally to a wheel hub bearing assembly for a wheel which is driven by means of a rotary constant velocity universal joint and which is arranged at an associated wheel carrier of a motor vehicle.

In the type of device to which the invention relates, the wheel bearing is held by the wheel carrier and the wheel hub and an inner bearing ring of the wheel bearing are connected in rotating driving engagement with the outer joint member of a rotary constant velocity universal joint. The type of device to which the invention relates is structured with the bearing assembly and the universal joint formed as two separate units.

In devices of the type to which the present invention relates, such as that disclosed in U.S. Pat. No. 3,586,357, a wheel bearing is provided with a joint capable of transmitting torque by means of end teeth on the inner bearing ring and from an inner bearing ring through further end teeth to the wheel hub. However, in a device of this type, it is difficult to ensure concentric operation of the individual components relative to each other. Additionally, all wheel contact forces, lateral forces, and bending moments of the wheel must be accommodated. Furthermore, a large number of components is required to permit not only torque to be transmitted, but also accurate design of the actual bearing.

The present invention is accordingly directed toward providing a wheel bearing assembly which consists of two finish-assembled units which are easy to assemble and dismantle and wherein a joint may be formed largely by means which do not involve chip forming metal cutting and which may have a shorter axial length in order to comply with normal assembly requirements.

SUMMARY OF THE INVENTION

Briefly, the present invention may be described as a wheel assembly for a motor vehicle comprising a bearing assembly including an inner bearing member and means for rotatably supporting a wheel, a universal joint including an outer joint member for driving the wheel, the inner bearing ring being fitted in rotative driving engagement within the outer joint member with an outer circumferential portion of the bearing ring being formed with a configuration generally corresponding with the configuration of an inner contour of the outer joint member to establish a form-fitted connection therebetween for rotative driving engagement, and securing means for maintaining the inner bearing ring and the outer joint member axially fixed relative to each other.

In accordance with a more specific aspect of the invention, the inner bearing ring and outer joint member may be formed with interfitted recesses and projections for establishing the rotative driving engagement therebetween.

With a design such as that of the present invention, advantages arise in that by utilizing a form-fitting connection, the joint will not involve large dimensions in the axial direction which would occur if conventional production methods were to be applied. Additionally, the form-fitting connection can be designed in such a manner that no special production techniques will be required.

In accordance with a further feature of the invention, the inner bearing ring may be provided with outwardly extending projections which correspond with the cross-sectional configuration of grooves and with which the inner bearing ring projects into the grooves of the outer joint member.

The structure of the present invention may be advantageously utilized in cases where grooves of the outer joint member extend axis-parallel and are arranged in median planes or are designed so as to be free of undercuts. Such a design permits easy production of both the actual joint part and of the connecting part, and the connection between both parts may be achieved merely by sliding the outer joint member onto the inner bearing ring.

Since the parts are rotatively symmetrical and since, in producing the parts, turning and grinding operations prevail, the two parts will be secured with respect to each other by securing means which may comprise a securing ring arranged in a recess of the inner face of the outer joint member and in a corresponding recess on the outer face of the inner bearing ring.

Additionally, provision may be made for closing a bore of the inner bearing ring by a sealing cap, the advantage being that the joint interior need not be additionally sealed and that the seal may be effected on the diameter of the inner bearing ring. The joint need merely be provided with a sealing sleeve between the input shaft and the outer joint member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
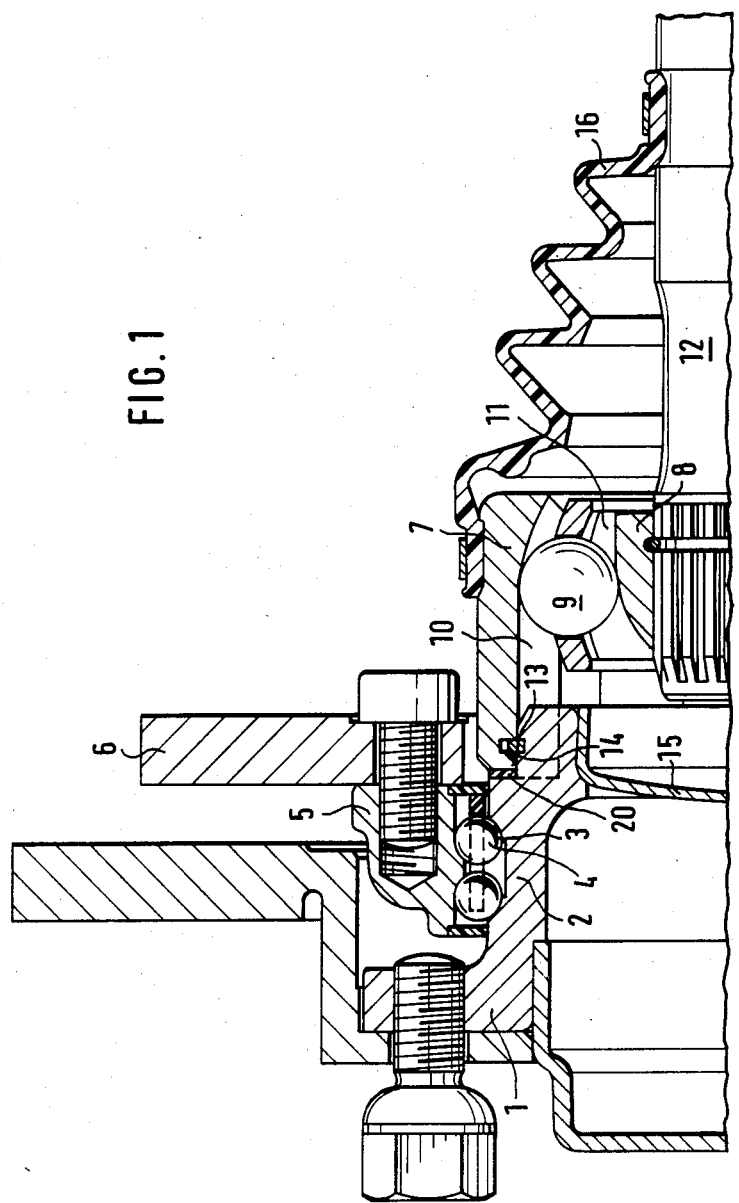
FIG. 1 is an axial sectional view showing a wheel assembly with a wheel bearing and universal drive joint.

Referring now to the drawings, wherein similar reference numerals are utilized to identify like parts throughout the various figures thereof, there is shown a motor vehicle wheel assembly which comprises a wheel bearing with a rotary constant velocity universal joint. The assembly consists essentially of a wheel hub 1 which is formed integrally with an inner bearing ring 2 of the wheel bearing. On the outer face of the inner bearing ring 2 there are formed grooves 3 for receiving ball bearings 4. The inner bearing ring 2, the ball bearings 4, and an outer ring 5 form the wheel bearing. The outer ring 5 of the wheel bearing is bolted to a flange 6 of an associated wheel carrier (not shown). The wheel hub 1 to which the wheel and possibly a brake disc are connected operates to transmit driving force to the vehicle wheels.

The universal joint is connected to the inner bearing ring 2 of the bearing assembly. The universal joint consists essentially of an outer joint member 7 and an inner joint member 8 with balls 9 being received therebetween in grooves 10 of the outer joint member 7 and in grooves 11 of the inner joint member 8 to enable torque transmission. Additionally, the inner joint member 8 is formed with a bore into which an input shaft 12 engages by means of longitudinal teeth or splines.

The outer joint member 7 is adapted to slide onto the inner bearing ring 2 and to be axially fixed relative thereto by a securing ring 13. Force is transmitted from the outer joint member 7 to the inner bearing ring 2 by means of a form-fitted connection 14 which operates to place the members in rotative driving engagement with each other.

The universal joint is filled with a lubricant and this lubricant may be sealed by means of a sealing cap 15 located toward the inner bearing ring. Additionally, provision is made for a flat seal 20 and for bellows 16 on the side of the universal joint toward the input shaft 12.

Figure 2:
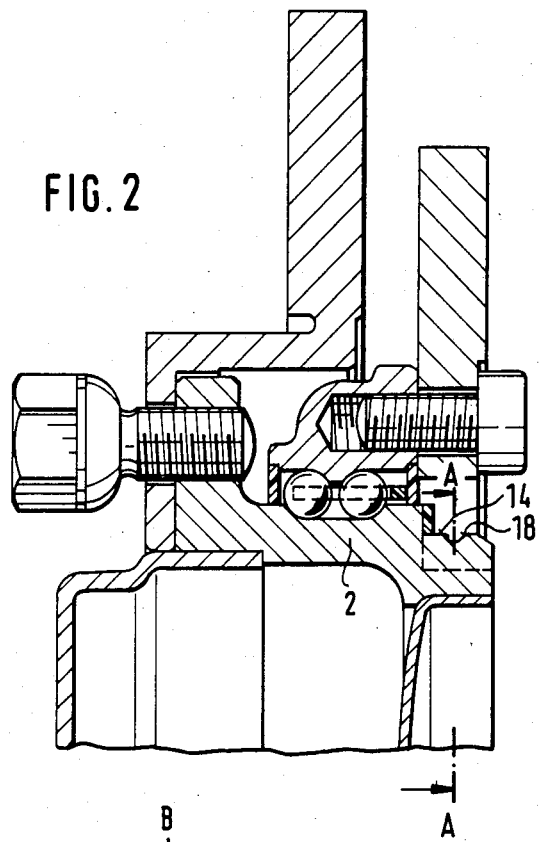
FIG. 2 is an axial view showing, as an individual component, the wheel bearing illustrated in FIG. 1.
Figure 3:
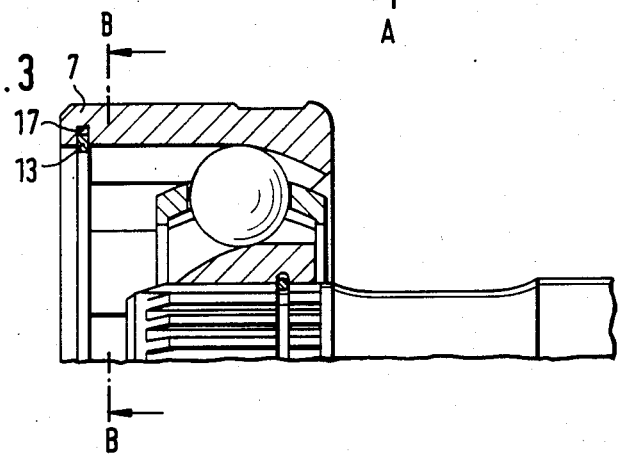
FIG. 3 is a sectional view showing, as an individual component, the universal joint shown in FIG. 1.

In FIGS. 2 and 3, the parts of the assembly shown in FIG. 1 are depicted as separated components. FIG. 2 shows the bearing assembly and FIG. 3 shows the universal joint, and again it is the inner bearing ring 2 which is connected to the outer joint member 7 by means of the form-fitting connection 14. The parts are axially secured together by means of the securing ring 13 which is arranged to be fitted into a recess 17 formed in the outer joint member 7, with the securing ring 13 engaging into a recess 18 formed in the inner bearing ring 2 after assembly.

Figure 4:
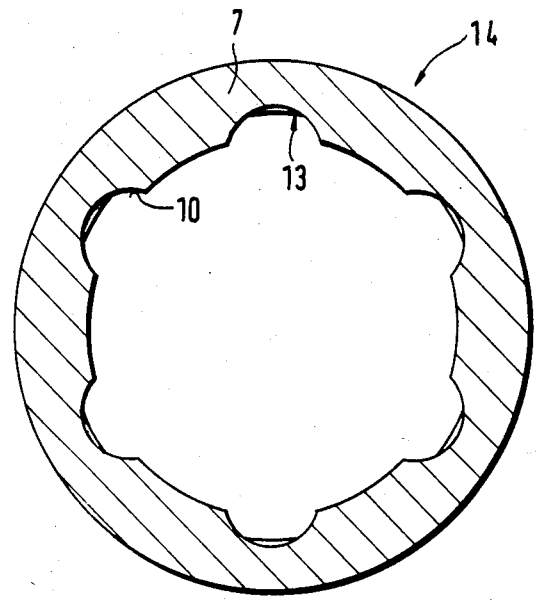
FIG. 4 is a cross-sectional view of the outer joint member of the universal joint.
Figure 5:
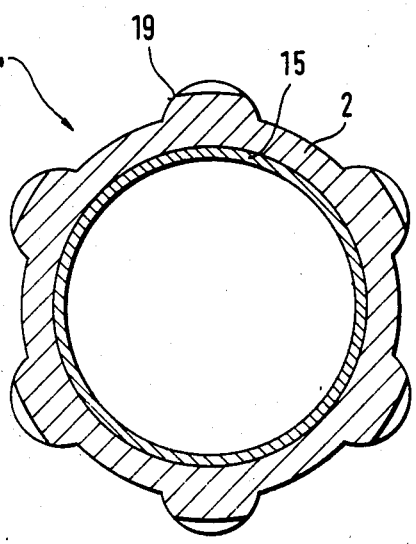
FIG. 5 is a cross-sectional view of the inner bearing ring of the bearing assembly.

FIGS. 4 and 5 show sectional views of the form-fitted connection 14, and in FIG. 4 there is illustrated the configuration of the outer joint member 7 which has grooves 10 which serve to receive the balls 9. Projections 19 of the inner bearing ring 2 are arranged to engage within the grooves 10 in order to establish the form-fitted connection 14 which ensures that torque is transmitted from the outer joint member 7 to the inner bearing ring 2. For sealing purposes, the sealing cap 15 is pressed onto the inner bearing ring 2 so that lubricant cannot escape.

Thus, it will be seen that in accordance with the present invention there is provided a wheel bearing which essentially consists of two units and which may be formed substantially without chip producing metal cutting. The objective of the invention is achieved in that the inner bearing ring 2, at the end thereof facing the universal joint, is formed with a cross-sectional configuration relative to the axis of rotation which has an outer circumference corresponding to the inner contour of the outer joint member 7. In the circumferential direction, both the ring 2 and the member 7 form a fitted connection 14 and the inner bearing ring 2 and the outer joint member 7 are axially fixed relative to each other by the securing means 13. As a result of the engagement of the projections 19 and the grooves 10, rotative driving engagement between the parts is established.

While a specific embodiment of the invention has been shown and described in detail to illustrate the application of the inventive principles, it will be understood that the invention may be embodied otherwise without departing from such principles.

What is claimed is:

1. A wheel assembly for a motor vehicle comprising: a bearing assembly including an inner bearing ring and means for rotatively supporting a wheel; a universal joint including an outer joint member for driving said wheel; said inner bearing ring being fitted in rotative driving engagement within said outer joint member with an outer circumferential portion of said inner bearing ring being formed with a configuration generally corresponding with the configuration of an inner contour of said outer joint member to establish a form-fitted connection therebetween providing rotative driving engagement in the circumferential direction; and securing means for maintaining said inner bearing ring and said outer joint member axially fixed relative to each other.

2. An assembly according to claim 1 wherein said form-fitted connection comprises outwardly extending projections formed on said inner bearing ring and grooves formed on said outer joint member with said projections corresponding in cross-sectional configuration with said grooves and with said projections of said inner bearing ring projecting into said grooves of said outer joint member.

3. An assembly according to claim 1 wherein said securing means comprise a securing ring and recesses formed in the inner face of said outer joint member and in the outer face of said inner bearing ring with said securing ring being arranged in said recesses.

4. An assembly according to claim 1 wherein said inner bearing ring comprises a bore which is closed by a sealing cap.

* * * * *